United States Patent
Cheng

(10) Patent No.: US 7,204,465 B2
(45) Date of Patent: Apr. 17, 2007

(54) STRUCTURE OF AN ARTICLE HOLDER

(76) Inventor: Pao-Hsien Cheng, No. 139, Jen Yi 1st Street, Jen Te Hsiang, Tainan Hsien (TW)

( * ) Notice: Subject to any disclaimer, the term of this patent is extended or adjusted under 35 U.S.C. 154(b) by 30 days.

(21) Appl. No.: 11/225,072

(22) Filed: Sep. 14, 2005

(65) Prior Publication Data
US 2007/0057134 A1    Mar. 15, 2007

(51) Int. Cl.
*A47K 1/08* (2006.01)
(52) U.S. Cl. .................. 248/311.2; 248/309.1; 248/318
(58) Field of Classification Search ............ 248/309.1, 248/311.2, 318, 323, 324, 339, 340; 224/275, 224/282, 926, 407; 220/4.33, 6, 7, 482, 23.4, 220/481, 480
See application file for complete search history.

(56) References Cited

U.S. PATENT DOCUMENTS

| | | | | |
|---|---|---|---|---|
| 2,628,054 | A * | 2/1953 | Fazakerley | 248/311.2 |
| 2,960,601 | A * | 11/1960 | Higgins | 362/477 |
| 3,477,679 | A * | 11/1969 | Lovitz | 248/213.2 |
| 3,717,253 | A * | 2/1973 | Lovitz | 210/167.27 |
| 3,844,519 | A * | 10/1974 | Garrett | 248/226.11 |
| 3,847,286 | A * | 11/1974 | Garrett | 211/13.1 |
| 4,697,780 | A * | 10/1987 | Wenkman et al. | 248/558 |
| 5,143,337 | A * | 9/1992 | Tomayko et al. | 248/311.2 |
| 5,320,263 | A * | 6/1994 | Kobylack | 224/274 |
| 5,472,167 | A * | 12/1995 | Shillington et al. | 248/552 |
| 5,531,238 | A * | 7/1996 | Azzarelli et al. | 135/66 |
| 5,779,206 | A * | 7/1998 | Harris et al. | 248/214 |
| 5,857,601 | A * | 1/1999 | Greenwood | 224/409 |
| 6,036,071 | A * | 3/2000 | Hartmann et al. | 224/547 |
| 6,315,182 | B1 * | 11/2001 | Chen | 224/420 |
| 7,021,825 | B1 * | 4/2006 | Schultz | 383/76 |
| 2005/0224676 | A1 * | 10/2005 | Stavermann | 248/311.2 |
| 2006/0175506 | A1 * | 8/2006 | Lan | 248/311.2 |

* cited by examiner

*Primary Examiner*—Carl D. Friedman
*Assistant Examiner*—Bradley Duckworth
(74) *Attorney, Agent, or Firm*—Rosenberg, Klein & Lee

(57) ABSTRACT

An article holder includes a holding member, and hooking members; the holding member has several gaps, and a connecting protrusion in each of the gaps; each of the connecting protrusions has a downwards-projecting edge at an outward end; each hooking member has a straight rod portion, which has a cavity, and a transverse hole under and in communication with the cavity; the hooking members are hooked over an object while the holding member is hung on the hooking members with the lower ends of the straight rod portions being held in the gaps, the connecting protrusions being received in the cavities, and the downwards-projecting edges being fitted in the transverse holes; the holding member can be angularly displaced after it is linearly displaced to such a position that the downwards-projecting edges are outside the transverse holes; thus, the holding member can be hung in a vertical position when not in use.

1 Claim, 8 Drawing Sheets

STRUCTURE OF AN ARTICLE HOLDER

BACKGROUND OF THE INVENTION

1. Field of the Invention

The present invention relates to an article holder, more particularly one, which includes several hooking members, and a holding member capable of being pivoted on the hooking members to fold the article holder into a compact shape.

2. Brief Description of the Prior Art

Ordinary hospital beds and baby beds are equipped with casters so that they can be easily moved. And, many hospital beds and baby beds have article holders hung on upper horizontal rod parts thereof for supporting bottles, cans etc.

Such article holders include a holding member, and several hooking members securely connected to an edge of the holding member in a vertical position, and they have the following drawbacks:

1. Each of the article holders needs a large packaging box because the hooking members thereof stick upwards from the upper side of the holding member. Consequently, the cost of storage and transportation is relatively high.

2. The holding member can't be pivoted relative to the hooking members therefore it will stick sideways from the hospital bed or baby bed to cause inconvenience even if it isn't in use.

SUMMARY OF THE INVENTION

It is a main object of the invention to provide an improvement on an article holder to overcome the above-mentioned problem. The article holder of the present invention includes a holding member, and hooking members. The holding member has several gaps, and a connecting protrusion in each of upper sections of the gaps. Each of the connecting protrusions has a downwards-projecting edge at an outward end. Each hooking member has a hooked portion, and a straight rod portion, which has a cavity, and a transverse hole under and in communication with the cavity. The hooking members are hooked over an object while the holding member is hung on the hooking members with the lower ends of the straight rod portions thereof being held in the gaps, the connecting protrusions being received in the cavities, and the downwards-projecting edges being fitted in the transverse holes. The holding member can pivot on the hooking members after it is linearly displaced to such a position that the downwards-projecting edges are outside the transverse holes. Therefore, the holding member can be hung in a vertical position when the article holder is not in use. And, the hooking members can be positioned on a bottom of the holding member for easy storage.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
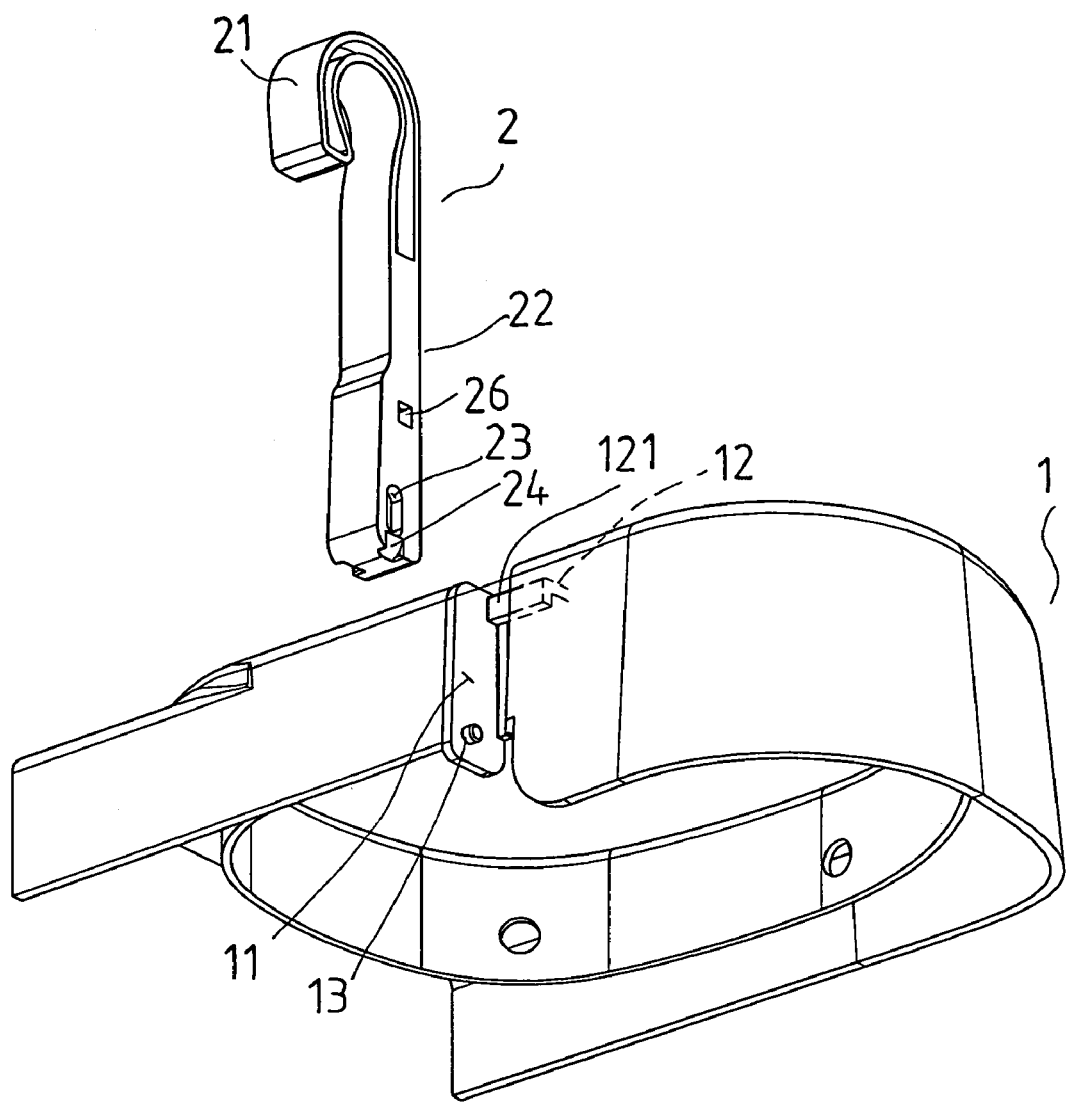
FIG. 1 is an exploded perspective view of the article holder of the present invention.

Referring to FIGS. 1 to 4, a preferred embodiment of an article holder of the present invention includes a holding member 1, and several hooking members 2.

The holding member 1 has several gaps 11 longitudinally extending from a top to a bottom thereof, a connecting protrusion 12 in each of upper sections of the gaps 11, and two opposed pivotal protrusions 13 in each of lower sections of the gaps 11. Each of the connecting protrusions 12 has a hooking edge 121 at an outward end thereof, which projects downwards.

Each of the hooking members 2 has a hooked portion 21 at an upper end, and a straight rod portion 22 at a lower end thereof, which straight rod portion 22 is formed with an elongate recess 23 on each of two lateral sides of a lower end thereof, a slope 24 under and adjacent to each of the elongate recesses 23, a cavity 25 on a rear side thereof, and a transverse hole 26 under and in communication with the cavity 25.

Figure 2:
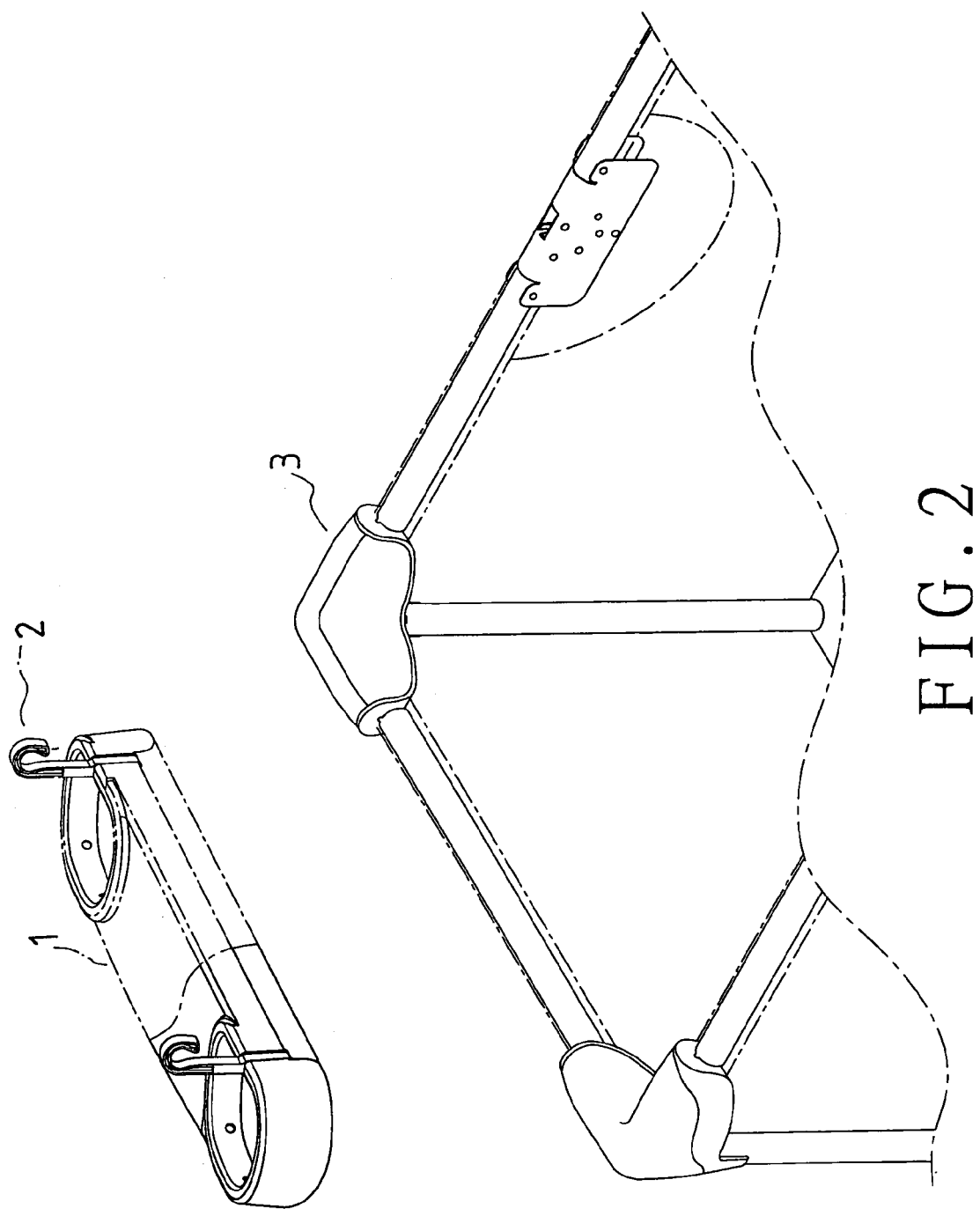
FIG. 2 is a perspective view of the article holder of the invention.
Figure 3:
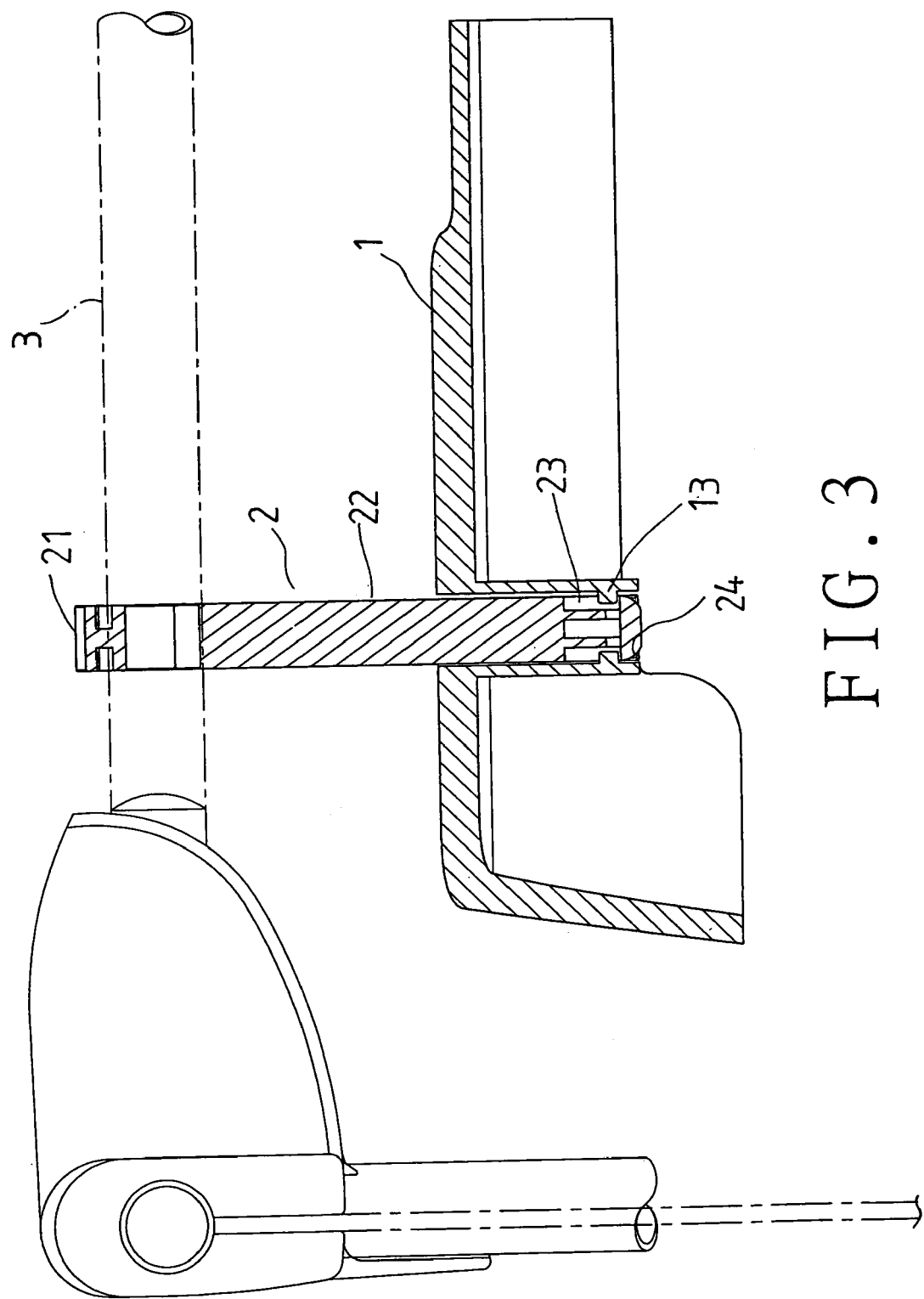
FIG. 3 is a sectional view of the article holder of the invention.
Figure 4:
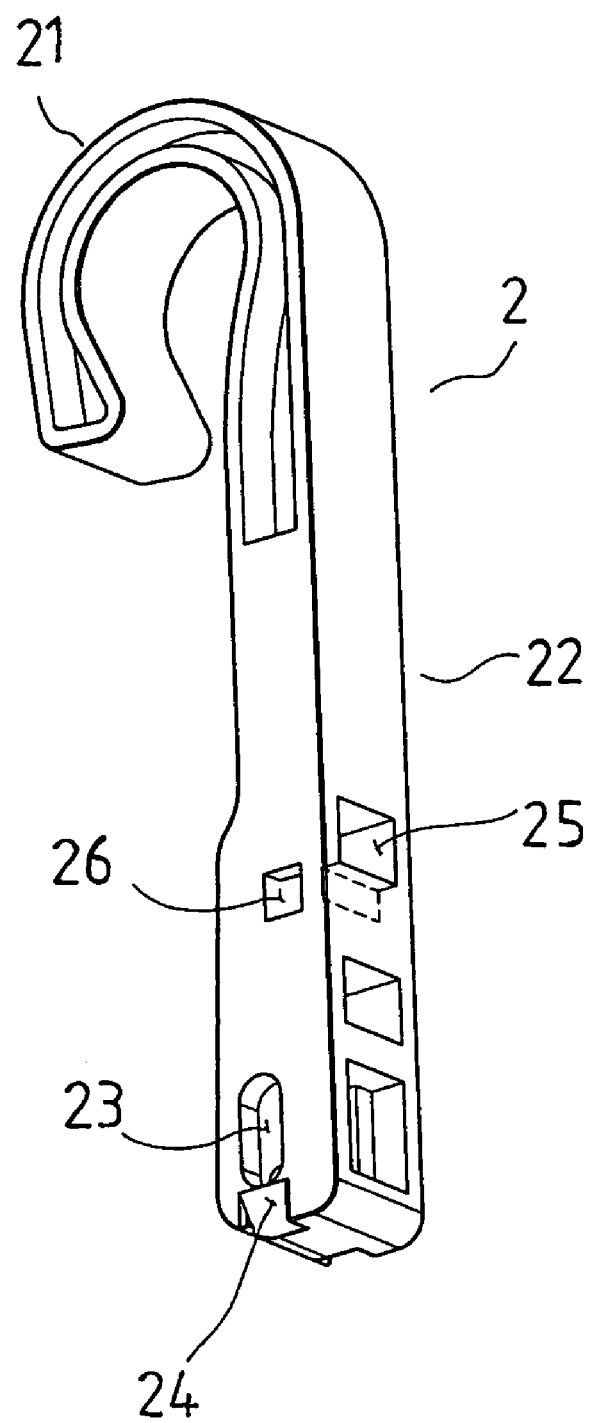
FIG. 4 is a perspective view of the hooking member.
Figure 6:
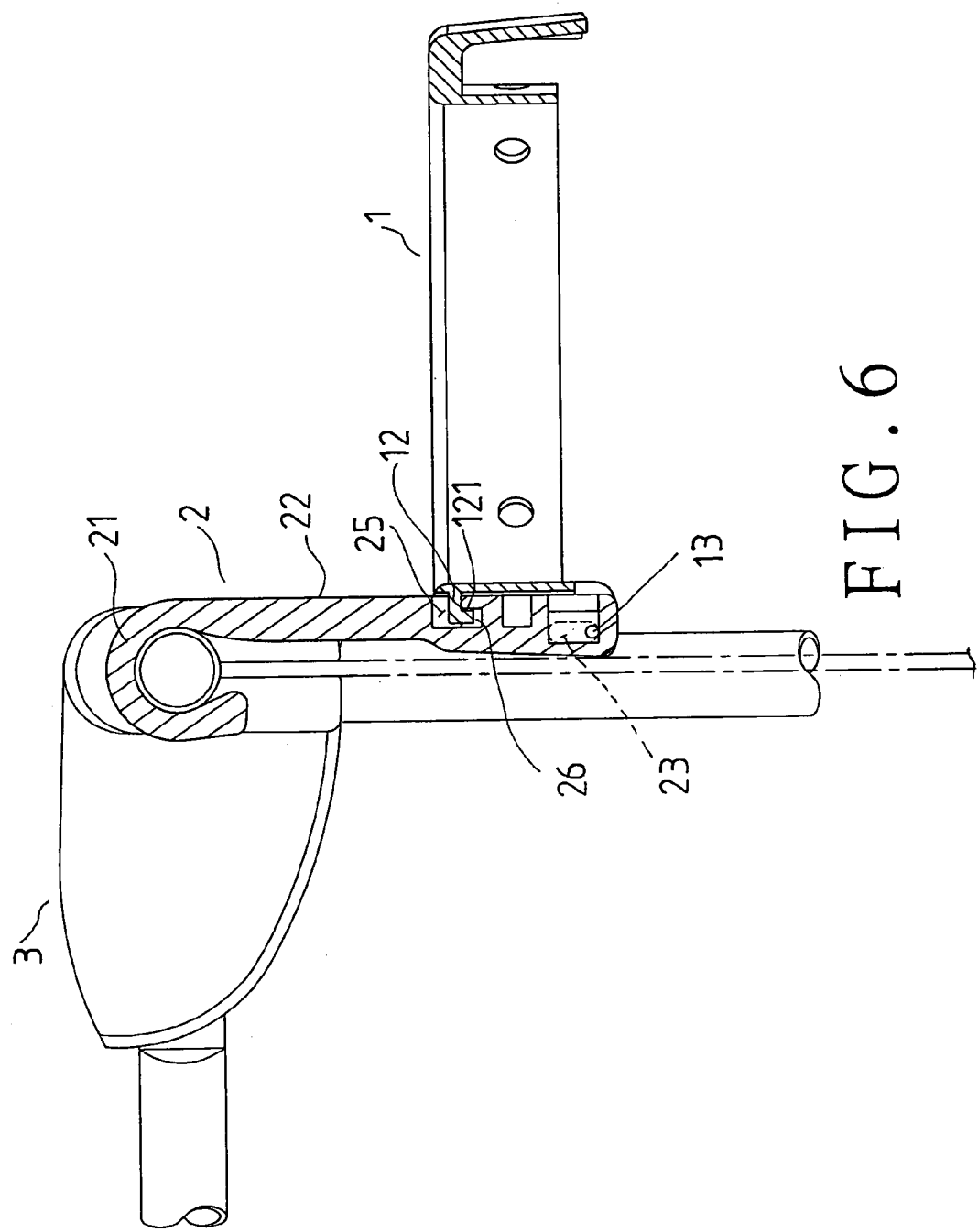
FIG. 6 is a lateral sectional view of the article holder in its in-use position.
Figure 7:
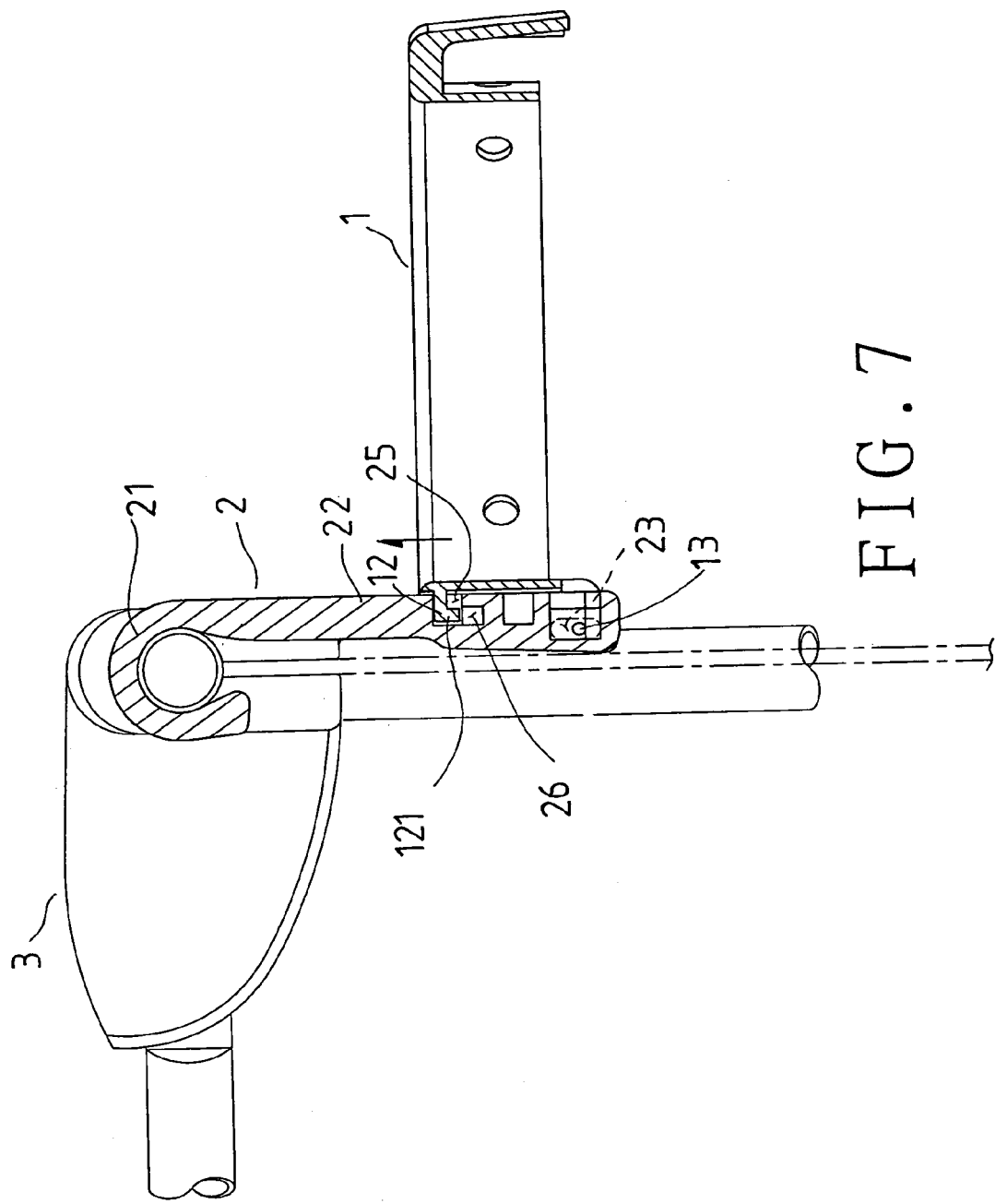
FIG. 7 is a lateral sectional view of the article holder, with the holding member being elevated.

Referring to FIGS. 2, 3, and 6, which show the present article holder in its in-use position, the hooking members 2 are connected to the holding member 1 with the lower ends of the straight rod portions 22 being respectively held in the gaps 11, the connecting protrusions 12 being respectively received in the cavities 25, the hooking edges 121 of the connecting protrusions 12 being respectively fitted in the transverse holes 26, and the pivotal protrusions 13 being received in respective ones of the elongate recesses 23, as shown in FIG. 6. And, the hooking, members 2 are hooked over an object 3, e.g. an upper horizontal rod part of the frame of a baby bed; thus, the article holder is hung on the baby bed with the holding member 1 being held in a horizontal position for allowing articles to be positioned thereon.

In assembly, first the holding member 1 is held in a horizontal position with the upper side facing upwards, and the hooking members 2 are passed into respective ones of the lower sections of the gaps 13 of the holding member 1 from the lower ends of the straight rod portions 22 thereof; thus, the pivotal protrusions 13 of the holding member 1 will be held in respective ones of the elongate recesses 23 of the straight rod portions 22; the slopes 24 will be tightly pressed against the pivotal protrusions 13 such that the hooking members 2 can be easily moved upwards and passed into the lower sections of the gaps 11 for the pivotal protrusions 13 to be received in the elongate recesses 23. Next, the hooking members 2 are pivoted upwards on the pivotal protrusions 13 until the connecting protrusions 12 of the holding member 1 are held in respective ones of the cavities 25. Then, the hooking members 2 are moved down relative to the holding member 1 such that the hooking edges of the connecting protrusions 12 are received in the transverse holes 26. Thus, the holding member 1 will be fixed in the horizontal position after the hooking members 2 are hooked over an object such as an upper horizontal rod part of the frame of a baby bed, as shown in FIG. 6.

Figure 8:
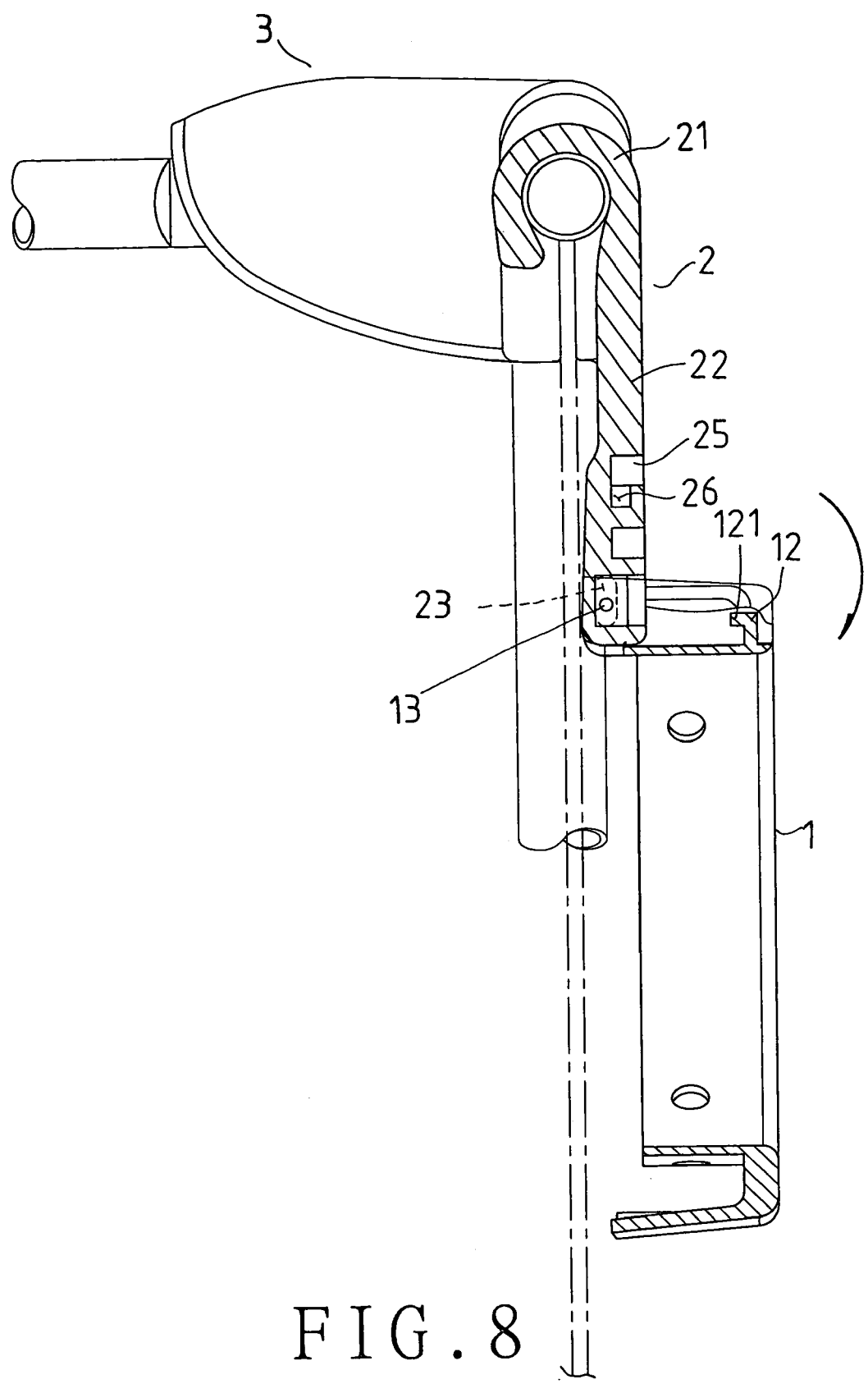
FIG. 8 is a lateral sectional view of the article holder in its not-in-use position.

When the present article holder isn't in use, the holding member 1 is first moved upwards and pivoted downwards on the hooking members 2 such that the holding member 1 is hung on the hooking members 2 in a vertical position, and the article holder won't stick sideways to cause inconvenience, as shown in FIG. 8; after the holding member 1 is moved upwards relative to the hooking members 2, the hooking edges 121 will no longer be held in the transverse holes 26, and in turn the holding member 1 can be pivoted downwards.

Figure 5:
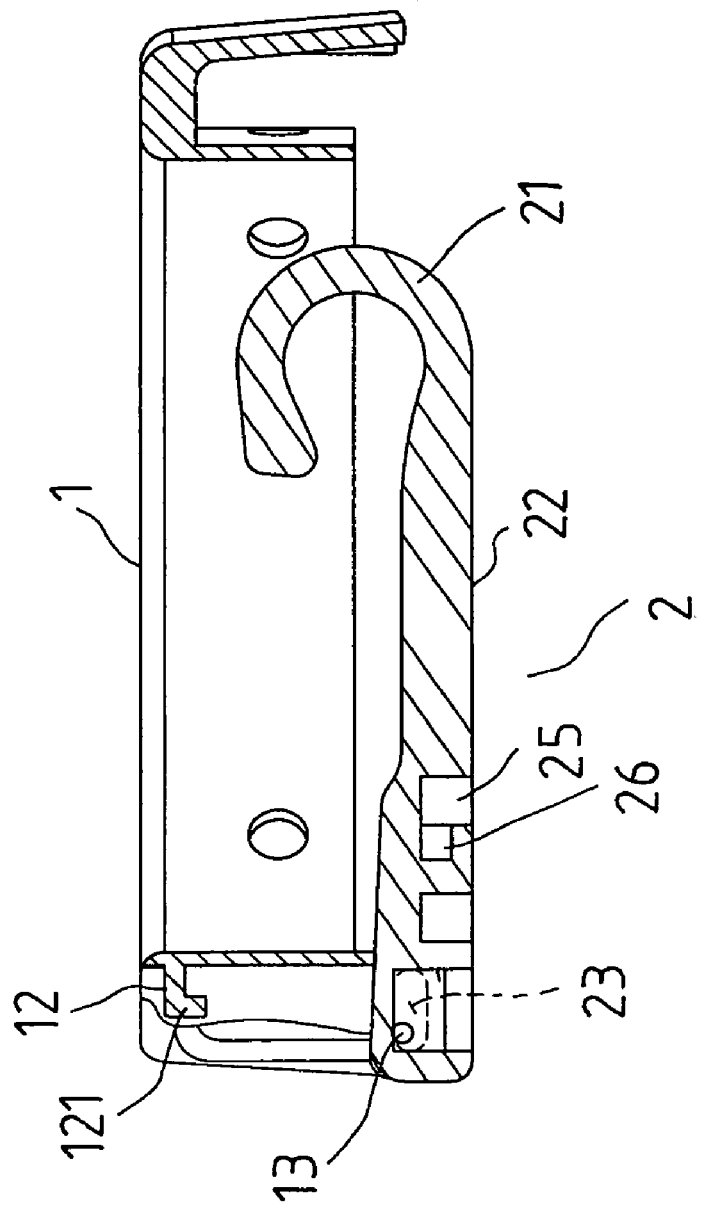
FIG. 5 is a lateral sectional view of the article holder in its storage position.

When the user wants to store, package or transport the present article holder, he should pivot the hooking members 2 until the hooking members 2 are close to the bottom of the holding member 1, as shown in FIG. 5. Therefore, the article holder will be more compact and easier to store and transport.

From the above description, it can be easily seen that the article holder of the present invention has the following advantages:

1. The article holder can be folded into a compact shape with the hooking members being close to the bottom of the holding member therefore it can be packaged in a smaller box for easy storage and transportation.

2. When the article holder isn't in use, the holding member can be angularly displaced relative to the hooking members so as to be hung in a vertical position instead of sticking sideways to unnecessarily occupy extra space.

What is claimed is:

1. Structure of an article holder, comprising a holding member for supporting articles; the holding member having a plurality of gaps longitudinally extending from a top to a bottom thereof; the holding member having a connecting protrusion in each of upper sections of the gaps thereof; the holding member having two opposed pivotal protrusions in each of lower sections of the gaps thereof; each of the connecting protrusions having a hooking edge, which projects downwards, at an outward end thereof; and a plurality of hooking members; each of the hooking members having a hooked portion at an upper end, and a straight rod portion at a lower end thereof; each of the straight rod portions having an elongate recess on each of two lateral sides of a lower end thereof; each straight rod portion having a slope under and adjacent to each of the elongate recesses thereof; each straight rod portion having a cavity on a rear side thereof; each straight rod portion being formed with a transverse hole under and in communication with the cavity thereof;

the hooking members being hooked over an object at the hooked portions thereof; the holding member being hung on the hooking members with the lower ends of the straight rod portions being respectively held in the gaps, the connecting protrusions being respectively received in the cavities, the hooking edges of the connecting protrusions being respectively fitted in the transverse holes, and the pivotal protrusions being received in respective ones of the elongate recesses; the holding member being angularly displaceable relative to the hooking members after the holding member is linearly displaced relative to the hooking members to such a position that the hooking edges of the connecting protrusions thereof are outside the transverse holes.

\* \* \* \* \*